United States Patent [19]
Styron

[11] Patent Number: 5,997,632
[45] Date of Patent: *Dec. 7, 1999

[54] BLENDED HYDRAULIC CEMENT

[75] Inventor: Robert William Styron, Marietta, Ga.

[73] Assignee: Mineral Resources Technologies, LLC, Atlanta, Ga.

[ * ] Notice: This patent is subject to a terminal disclaimer.

[21] Appl. No.: 09/016,605

[22] Filed: Jan. 30, 1998

Related U.S. Application Data

[63] Continuation-in-part of application No. 08/798,711, Feb. 12, 1997, Pat. No. 5,714,003.

[51] Int. Cl.$^6$ .............................. C04B 7/28; C04B 7/12; C04B 7/13; C04B 14/04
[52] U.S. Cl. ................ 106/705; 106/706; 106/707; 106/708; 106/709; 106/710; 106/735; 106/737; 106/810; 106/738; 106/774; 106/782; 106/785; 106/DIG. 1
[58] Field of Search ..................... 106/705, 706, 106/707, 708, 709, 710, 737, 810, DIG. 1, 738, 774, 782, 785, 735; 264/DIG. 49

[56] References Cited

U.S. PATENT DOCUMENTS

| | | |
|---|---|---|
| 4,121,945 | 10/1978 | Hurst et al. . |
| 4,226,630 | 10/1980 | Styron . |
| 4,313,753 | 2/1982 | Segawa et al. . |
| 4,624,711 | 11/1986 | Styron . |
| 4,640,715 | 2/1987 | Heitzmann et al. . |
| 4,842,649 | 6/1989 | Heitzmann et al. . |
| 4,877,453 | 10/1989 | Loggers . |
| 4,961,790 | 10/1990 | Smith et al. . |
| 4,997,484 | 3/1991 | Gravitt et al. . |
| 5,196,620 | 3/1993 | Gustin et al. . |
| 5,227,047 | 7/1993 | Hwang . |
| 5,299,692 | 4/1994 | Nelson et al. . |
| 5,352,288 | 10/1994 | Mallow . |
| 5,374,308 | 12/1994 | Kirkpatrick et al. . |
| 5,387,283 | 2/1995 | Kirkpatrick et al. . |
| 5,439,518 | 8/1995 | Francis et al. . |
| 5,456,363 | 10/1995 | Groppo et al. . |
| 5,489,334 | 2/1996 | Kirkpatrick et al. . |
| 5,490,889 | 2/1996 | Kirkpatrick et al. . |
| 5,513,755 | 5/1996 | Heavilon et al. . |
| 5,584,926 | 12/1996 | Borgholm et al. . |
| 5,624,491 | 4/1997 | Liskowitz et al. . |
| 5,714,003 | 2/1998 | Styron ..................................... 106/705 |

OTHER PUBLICATIONS

Ramachandran, "Concrete Admixtures Handbook–Properties, Science and Technology", Noyes Publications, p. 526, 1984 (no month).
Appendix F, "Handbook for the Identification of Alkali–Silica Reactivity in Highway Structures," Strategic Highway Research Program, 1991 (no month).
"Guide to Alkali–Aggregate Reactivity," Mid–Atlantic Regional Technical Committee, Jun. 1993.
Helmuth, "Alkali–Silica Reactivity: An Overview of Research," Strategic Highway Research Program, 1993 (no month).
Stark et al., "Eliminating or Minimizing Alkali–Silica Reactivity," Strategic Highway Research Program, 1993 (no month).
Chemical Abstracts Search, Sep. 24, 1997.
Dialog Article Search, Sep. 25, 1997.

*Primary Examiner*—Michael Marcheschi
*Attorney, Agent, or Firm*—Killworth, Gottman, Hagan & Schaeff, LLP

[57] ABSTRACT

The present invention is directed to blended hydraulic cement compositions which are formed with subbituminous fly ash. In one embodiment, the cement composition comprises from about 0.1 wt. % to about 7 wt. % of a retarding agent; from about 0.1 wt. % to about 4 wt. % potassium carbonate; from about 0.1 wt. % to about 4 wt. % citric acid; from about 0.1 wt. % to about 5 wt. % lithium carbonate; and from about 85 wt. % to about 99.7 wt. % of a subbituminous fly ash. In another embodiment, the cement composition comprises from about 0.1 wt. % to about 7 wt % of a retarding agent; from about 0.1 wt. % to about 6 wt. % of an alkali source selected from the group consisting of potassium carbonate, potassium hydroxide and blends thereof; from about 0.1 wt. % to about 4 wt. % citric acid; from about 0.1 wt. % to about 5 wt. % lithium carbonate; from about 25 wt. % to about 91.7 wt. % of a first subbituminous fly ash having a lime content; and from about 8 wt. % to about 60 wt. % of a second fly ash selected from the group consisting of lignite fly ash, bituminous fly ash and scrubber material.

18 Claims, No Drawings

BLENDED HYDRAULIC CEMENT

CONTINUATION DATA

The present application is a continuation-in-part of U.S. patent application Ser. No. 08/798,711 filed Feb. 12, 1997 entitled "Blended Hydraulic Cement," which issued as U.S. Pat. No. 5,714,003 on Feb. 3, 1998.

FIELD OF THE INVENTION

The present invention is directed to a blended hydraulic cement composition. More particularly, the present invention is directed to a blended hydraulic cement composition employing subbituminous fly ash and mixtures of such a fly ash with either lignite fly ash, bituminous fly ash or scrubber material.

BACKGROUND OF THE INVENTION

Fly ash comprises finely divided inorganic products produced by the combustion of coal. Enormous amounts of fly ash are produced annually nationwide, principally from burning coal in electric power plants. Disposal of fly ash poses an increasingly difficult problem because the volume, the particulate nature and the varied chemical composition of fly ash limit the number of acceptable disposal sites. Such sites require sophisticated and expensive engineering, design, construction and operational controls to be in place to manage and dispose of the fly ash. Furthermore, the capacity of these disposal sites is not unlimited.

Fly ash of particular composition has been used as an additive in portland cement but such fly ashes have not been hydraulic, i.e., self-setting. Rather, the fly ash has been added to strengthen the cement, evidently, by reacting with excess free lime and by reacting with sulfate compounds which would otherwise attack the tricalcium aluminate and tetracalcium aluminoferrite compounds of portland cement.

U.S. Pat. No. 4,997,484 to Gravitt et al. discloses a hydraulic cement which uses a subbituminous fly ash to achieve high strength in a short time when cured at room temperature. However, the cement compositions disclosed in this patent have limited uses because they cure too quickly. Particularly, the cement compositions disclosed in Gravitt initially cure in less than thirty minutes. Such a short period of time for curing is too short to use the cement compositions for anything other than patching.

Another quick curing hydraulic cement composition is disclosed in U.S. Pat. No. 5,374,308 to Kirkpatrick et al. The compositions disclosed in the Kirkpatrick patent employ a class C fly ash to achieve high strength in a short period time. Like the compositions disclosed in Gravitt, the compositions disclosed in Kirkpatrick cure too quickly to be useful for any other purpose than patching.

Thus, a need has developed in the art for a blended hydraulic cement formulated with fly ash which can be used for a variety of purposes from patching to forming concrete objects.

SUMMARY OF THE INVENTION

The hydraulic cement compositions of the present invention provide a solution to the current needs in the art by converting the fly ash into a useful product. The cement compositions of the present invention can be formulated to have a wide range of curing times so that they can be used for a variety of purposes such as patching or making concrete objects.

One embodiment of the blended hydraulic cement composition of the present invention comprises, by approximate weight percent: from about 0.1 wt. % to about 7 wt. % of a retarding agent; from about 0.1 wt. % to about 4 wt. % of potassium carbonate; from about 0.1 wt. % to about 4 wt. % of citric acid; from about 0.1 wt. % to about 5 wt. % of lithium carbonate; and from about 85 wt. % to about 99.7 wt. % of a subbituminous fly ash having a lime content This cement composition may also include from 0.5 wt. % to about 2 wt. % of potassium hydroxide as an additional alkali source. Also, the cement composition of this embodiment desirably has a lime content of at least about 21 wt. %.

More desirably, the lime content of the subbituminous fly ash is at least about 25 wt. % such that the cement composition contains a lime content of at least about 21%. Alternatively, to obtain a lime content of at least about 21%, the composition may further comprise up to about 10 wt. % of a beneficiating agent selected from the group consisting of calcium hydroxide and calcium oxide such that the beneficiating agent in combination with the lime content of the subbituminous fly ash provides the cement composition with a minimum lime content of at least about 21 wt. %.

One desirable embodiment of this composition comprises, by approximate weight percent: from about 0.1 wt. % to about 1 wt. % of gypsum; from about 0.4 wt. % to about 2 wt. % of potassium carbonate; from about 0.4 wt. % to about 1 wt. % of citric acid; from about 0.1 wt. % to about 3 wt. % of lithium carbonate; from about 88 wt. % to about 98.7 wt. % of the subbituminous fly ash; and from about 1 wt. % to about 10 wt. % of a type I portland cement. Even more desirably, this embodiment will also contain 0.5 wt. % to about 2.0 wt. % of potassium hydroxide.

In another embodiment of the invention, the cement composition includes a first subbituminous fly ash in combination with a second fly ash. Particularly, the composition comprises from about 0.1 wt. % to about 7 wt. % of a retarding agent; from about 0.1 wt. % to about 6 wt. % of an alkali source selected from the group consisting of potassium carbonate, potassium hydroxide and blends thereof; from about 0.1 wt. % to about 4 wt. % of citric acid; from about 0.1 wt. % to about 5 wt. % of lithium carbonate; from about 25 wt. % to about 91.7 wt. % of a first subbituminous fly ash having a lime content; and from about 8 wt. % to about 60 wt. % of a second fly ash selected from the group consisting of lignite fly ash, bituminous fly ash and scrubber material. It is desirable that this composition has a minimum lime content equal to 25% of the weight percentage of the first fly ash.

It is more desirable that the first fly ash have a lime content of at least 25% such that the minimum lime content of the composition is provided by the first fly ash. To increase the lime content of the cement composition of this embodiment, the cement composition may also include up to about 10 wt. % of the total composition of a beneficiating agent selected from the group consisting of calcium hydroxide and calcium oxide, such that the beneficiating agent, in combination with the lime content of the first fly ash, provides the composition with the minimum lime content.

Other objects and advantages of the present invention will become apparent from the following detailed description and the appended claims.

DETAILED DESCRIPTION OF THE INVENTION

It has been discovered that fly ash obtained from the combustion of subbituminous coal can be used to formulate a blended hydraulic cement which does not require portland cement to provide the cement composition with a minimum strength. By selecting particular fly ashes and by manipulating the formula, it has been found that fly ash obtained from the burning of subbituminous coal can be substituted for all or most of the portland cement composition of a hydraulic cement. Such a composition has a strength which is comparable to or superior to that of portland cement. It is desirable that the cement compositions of the present invention contain a lime content of at least about 21%. By providing such a lime content, the calcium concentration of the cement composition is increased which, in turn, increases the performance of the aluminate phases of the cement and causes an increase in the strength of the cement composition.

Fly ash produced by the combustion of subbituminous coal forms hard, stable products almost instantaneously with the addition of water. However, with addition of certain additives, the fly ash can be made into a useful hydraulic cement composition. Fly ash is typically recovered by means of electrostatic precipitators in electric power plant smokestacks. Because of its ability to set to a dense solid in a matter of minutes upon the addition of water, subbituminous fly ash is useful to form a blended hydraulic composition. Fly ash recovered from the combustion of coal from the Powder River Basin is the desirable subbituminous fly ash for use in the cement compositions of this invention. The Powder River Basin coal deposits occur in a well-defined region of northern Wyoming and southern Montana. Typically, this type of fly ash has a lime content of greater than or equal to about 25%.

Subbituminous fly ash useful to make the cement compositions of the present invention desirably shows the following components upon analysis:

| Component | Proportion (wt. %) |
|---|---|
| $SiO_2$ | 20–40 |
| $Al_2O_3$ | 10–30 |
| $Fe_2O_3$ | 3–10 |
| MgO | 0.5–8 |
| $SO_3$ | 1–8 |
| C | 0.5–2 |
| $H_2O$ | 0.33–3 |
| CaO | 25–35 |
| $K_2O$ | 0.5–4 |
| $Na_2O$ | 0.5–6 |
| $TiO_2$ | 0.5–2 |

The fineness of the fly ash will ordinarily be such that less than about 34% is retained on a 325 mesh sieve (U.S. Series) as tested on ASTM Test Proc. C-311 ("Sampling and Testing Procedures for Fly Ash as Mineral Admixture for Portland Cement Concrete"). This fly ash is preferably recovered and used dry because of its self-setting nature.

This embodiment of the cement composition of the present invention includes an agent which acts to retard and control the setting of the fly ash when the fly ash is mixed with water. Such a retarding agent will be present in the cement composition from about 0.1 wt. % to about 7 wt. % of the total composition. Desirably, the retarding agent will be present in the cement composition from about 0.1 wt. % to about 3.5 wt. %. Useful retarding agents are selected from the group consisting of gypsum; an antigelling dispersant; a mixture of borax and boric acid; and mixtures thereof. Desirably, the retarding agent is gypsum. Gypsum is particularly desirable because it can be used in lower dosages than the other listed retarding agents and because of its low cost when compared to the costs of the other listed retarding agents. Useful borax compositions and boric acid are available from U.S. Borax of Valencia, Calif. Useful melamine formaldehydes are available from SKW Chemicals, Inc. of Marietta, Ga. under the trade names MELMENT F10, F15 and F245. A useful antigelling dispersant is FRITZ-FLO ##1 L available from Fritz Industries of Mesquite, Tex. Useful gypsum is available from National Gypsum Company of Charlotte, N.C.

Citric acid ($HOOCCH_2C(COH)(COOH)CH_2COOH$) is a desired ingredient in the composition because it serves as both a retarder and reacts with an alkali source to form a fluidizing dispersing agent and a strong alkali to further solubilize silica added to the formulation to complete and contribute to the final cement composition. Citric acid can be used in any of its available grades, including fine crystal, liquid or powder. Salts of citric acid and the monohydrate may also be used in place of citric acid. It is desirable that the citric acid be of a technical grade. Useful citric acid is available from Ashta Chemicals of Cleveland, Ohio.

The composition of this embodiment also includes potassium carbonate as an alkali source which helps to solubilize silica added to the composition at the time of making of concrete. Desirably, this embodiment of the composition will also include from about 0.5 wt. % to about 2 wt. % of potassium hydroxide as an additional alkali source to further assist in the solubilization of the additional silica. Useful grades of both potassium hydroxide and potassium carbonate include crystal, technical and reagent.

The above ingredients are present in the blended hydraulic cement of the present invention in the following quantities. Quantities shown are approximate weight percent of the total composition.

| Component | Weight Percent |
|---|---|
| Subbituminous Fly Ash | 85–99.7 |
| Retarding Agent | 0.1–7 |
| Citric Acid | 0.1–4 |
| Alkali Source | 0.1–4 |

As stated above, the hydraulic cement composition of this embodiment desirably has a lime content of at least about 21%. It is more desirable that the cement composition of the first embodiment will have a lime content of greater than 21%. The desirable minimum lime content of at least 21% may be provided by either the subbituminous fly ash itself or by the subbituminous fly ash in combination with a beneficiating agent. If the lime content of the composition is provided solely by the subbituminous fly ash, then the subbituminous fly ash will have a minimum lime content of 25% to provide the cement composition with a minimum lime content of 21%.

Alternatively, to provide the cement composition with a lime content of at least 21%, the cement composition may include a beneficiating agent. Useful beneficiating agents are selected from the group consisting of calcium hydroxide (hydrated lime) and calcium oxide (quick lime). Typically, the beneficiating agent will be present in the composition in a concentration of up to about 10 weight percent of the total composition weight such that the combination of the beneficiating agent and the subbituminous fly ash provides the cement composition with the desired minimum lime content.

To provide the blended cement composition with additional compressive strength, the cement composition may include up to 10 weight percent of the total cement composition of a strength enhancing additive. Useful strength enhancing additives are selected from the group consisting of type I portland cement, ground cement clinker and ground slag. The slag used in combination with the present invention is a by-product of steel production and should be ground into a powder to be useful in the cement composition of the present invention. In addition to providing the cement composition with additional compressive strength, the materials used as strength enhancing additives increase the calcium content of the cement composition. Further, these strength enhancing additives may also be used to control the set time of a hydraulic cement composition.

A useful type I portland cement and useful ground clinker are available from Leheigh Cement Company of Allentown, Pa. Useful steel slag is available from Roanoke Cement Company of Roanoke, Va. It is desirable that ground cement clinker is used.

To inhibit alkali-silica reactivity in those areas in which alkali-silica reactivity is problematic, the cement composition of the present invention desirably includes lithium carbonate, $Li_2CO_3$. Lithium carbonate is thought to form lithium silicate compounds which prevent the formation of the expansive gel which disrupts the hardened cement structure during the alkali-silica reactivity process. Lithium carbonate is preferred over lithium hydroxide in a hydraulic cement blend because lithium hydroxide is hygroscopic and, for that reason, would reduce the shelf life of a blended hydraulic cement composition. Desirably, the formulation of the present invention includes from about 0.1 weight percent to about 5 weight percent lithium carbonate. More desirably, the lithium carbonate is present in the cement mixture from about 0.1 weight percent to about 3 weight percent.

Finally, the blended hydraulic cement of this embodiment may also include a pozzolanic material to provide the cement composition with an additional source of silica. The additional silica provided by the pozzolanic material enhances the strength of the final cement composition. Useful pozzolanic materials are selected from the group consisting of silica fume dust, potassium silicate, and aluminum silicate compounds such as kaolin and meta-kaolin ($Al_2O_3 \cdot SiO_2$). Meta-kaolin and kaolin are desirable because they enhance the strength of the cement composition by inhibiting alkali-aggregate reactivity. The pozzolanic material will be present in the cement composition up to about 5 weight percent. Useful silica fume dust is available from SKW of St. Lawrence, Quebec and useful meta-kaolin is available from Advanced Cement Technologies of Blaine, Wash. under the trade name POWERPOZZ™.

In one desirable formulation of this embodiment, the cement composition of the present invention comprises from about 88 wt. % to about 98.7 wt. % of a subbituminous fly ash. The composition additionally comprises from about 0.1 wt. % to about 1 wt. % gypsum; from about 0.4 wt. % to about 1 wt. % potassium carbonate; from about 0.4 wt. % to about 1 wt. % citric acid; and from about 1 wt. % to about 10 wt. % of a type I portland cement. It is desirable that this fly ash contains a lime content of at least 25%.

In another desirable formulation of this embodiment, the cement composition comprises from about 88 wt. % to about 98.7 wt. % of the total composition of a subbituminous fly ash. The composition additionally comprises from about 0.1 wt. % to about 7 wt. % of a retarding agent; from about 0.1 wt. % to about 4 wt. % potassium carbonate; from about 0.4 wt. % to about 1 wt. % citric acid; and from about 0.1 wt. % to about 5 wt. % lithium carbonate. This formulation may also include from about 1 wt. % to about 10 wt. % of a type I portland cement.

Although the cement composition of this embodiment can be formulated by mixing the components together at one time, it has been found that the following method is desired. The process includes the following steps in which weight percentages are of the total composition unless otherwise specified:

1. providing from about 85 wt. % to about 99.7 wt. % of the subbituminous fly ash;
2. separating out about a 10% portion of the subbituminous fly ash;
3. adding from about 0.1 to about 7 wt. % of the retarding agent; from about 0.1 to about 4 wt. % of citric acid; and from about 0.1 to about 4 wt. % of potassium carbonate to the 10% portion; and
4. mixing the remainder of the subbituminous fly ash with the 10% portion to form a blended hydraulic cement.

Desirably, the third step will also include the step of adding from about 0.5 wt. % to about 2 wt. % of potassium hydroxide to the 10% portion. The third step may also include adding from about 0.1 wt. % to about 5 wt. % of the lithium carbonate.

The process may include one or more of the following additional steps: adding up to about 10 wt. % of the strength enhancing additive to the 10% portion; and adding up to about 5 wt. % of the pozzolanic agent to the 10% portion.

If the mixture of boric acid and borax is used as the retarding agent, then the step of adding the retarding agent will include the steps of (a) adding from about 0.01 wt. % to about 6.9 wt. % of the total composition of borax to the 10% portion and (b) adding from about 0.01 wt. % to about 6.9 wt. % of the total composition of boric acid to the 10% portion.

To provide the cement composition of this embodiment with a desired minimum lime content, the process may also include the step of adding up to about 10 wt. % of the total composition of a beneficiating agent selected from the group consisting of calcium hydroxide and calcium oxide to the 10% portion so that the beneficiating agent in combination with the lime content of the class C fly ash provide the cement composition with a minimum lime content of about 21%.

The cement composition of this embodiment may also include a coloring agent in an amount of up to about 5%. For example, a coloring agent may be added to provide a resulting concrete mix with a red coloring to provide the concrete mix with a "brick" color. One skilled in the art will also appreciate go that the coloring agent can instead be added to the concrete mix rather than adding it to the cement composition. Useful coloring agents can be selected from those coloring agents currently in use in the art to color cement compositions and concrete mixes.

To formulate a concrete material, fine aggregate, coarse aggregate and water are added to the hydraulic cement composition of the first embodiment after the cement composition has been mixed together. The amounts of these materials to be added to the hydraulic cement composition are easily determinable by a person of skill in the art. The desired cement to water ratio for the cement compositions of this invention is about 1 to about 0.2–0.5 and is preferably about 1 to about 0.25–0.45.

In another embodiment, a mixture of fly ashes can be used to create a blended hydraulic cement. It has been discovered that lignite fly ash, bituminous fly ash and scrubber material, which have little to no inherent hydraulic properties, can be used to create a blended hydraulic cement. Particularly, a first subbituminous fly ash can be combined with a second fly ash selected from the group consisting of lignite fly ash, bituminous fly ash or scrubber material. These fly ashes generally have lime contents less than 25%. However, they may successfully be combined with higher lime content subbituminous fly ash to create a hydraulic cement with or without additional cementitious, beneficiating or pozzolanic elements. Further, the addition of lower lime content fly ashes to the higher lime content subbituminous fly ash increases the initial set time of the cement mixture. The first fly ash is present in the cement composition in an amount from about 25% to about 91.7% by weight of the total composition. The second fly ash is present in the cement composition in an amount from about 8 wt. % to about 60 wt. % of the total composition.

Scrubber material is recovered from the smokestacks of coal burning power plants. It is particularly useful because it has a high lime content which contributes to the overall strength of the cement mixture. A useful scrubber material is available from the Grand River Dam Authority in Chouteau, Okla.

It is desirable that this embodiment contains a threshold lime content equal to at least 25% of the total weight of the first fly ash. The desirable threshold lime content of the cement mixture of this embodiment can be obtained in two manners. First, the first fly ash can have a minimum lime content of 25% so that the lime content of the entire composition is provided by the first fly ash. Alternatively, the desirable cement composition may include a beneficiating agent such as CaO or CaOH which can be combined with the first fly ash to provide the cement composition with the threshold lime content. If the beneficiating agent is added to the cement composition, it will be added in a quantity up to about 10 wt. % of the total composition.

The composition of this alternate embodiment also includes from about 0.1 wt. % to about 4 wt. % of the total composition of citric acid; from about 0.1 wt. % to about 6 wt. % of the total composition of an alkali source selected from the group consisting of potassium carbonate, potassium hydroxide and blends thereof; and from about 0.1 wt. % to about 7 wt. % of a retarding agent. If the alkali source is a blend of potassium carbonate and potassium hydroxide, then it will include from about 0.1 wt. % to about 4 wt. % of potassium carbonate and from about 0.5 wt. % to about 2 wt. % of potassium hydroxide. The function of these components and their useful constituents are the same as described above.

The primary components of the second embodiment are, by approximate weight percent of the total composition, the following elements:

| Component | Weight Percent |
| --- | --- |
| First Fly Ash | 25–91.7 |
| Second Fly Ash | 8–60 |
| Retarding Agent | 0.1–7 |
| Alkali Source | 0.1–6 |
| Citric Acid | 0.1–4 |

The composition of this alternate embodiment may also include additives such as those listed above for the first embodiment. This embodiment may also include up to about 10 wt. % of the total composition of a strength enhancing additive selected from the group consisting of type I portland cement, ground cement clinker and ground slag. Additionally, it may include up to about 5 wt. % of the total composition of a pozzolanic material selected from the group consisting of silica fume dust, potassium silicate, and aluminum silicate compounds such as kaolin and meta-kaolin ($Al_2O_3 \cdot SiO_2$). Meta-kaolin and kaolin are desirable because they enhance the strength of the cement composition by inhibiting alkali-aggregate reactivity. The functions of these materials have been described above.

To inhibit alkali-silica reactivity in those areas in which alkali-silica reactivity is problematic, the cement composition of this embodiment also desirably includes lithium carbonate, $Li_2CO_3$. Desirably, the formulation of the present invention includes from about 0.1 weight percent to about 5 weight percent lithium carbonate. More desirably, the lithium carbonate is present in the cement mixture from about 0.1 weight percent to about 3 weight percent. The cement composition of this embodiment may also include a coloring agent in an amount of up to about 5%. Useful coloring agents are described above. As with the previous embodiment, the coloring agent may alternatively be added to the resulting concrete mix.

The blended hydraulic cement composition of the second embodiment is formulated in the following manner. Because a small amount of additives, such as the retarding agent, the alkali source and citric acid are used, in a total amount of no more than about 17 wt. % of the total weight of the cement composition, the best results are achieved when the additives are initially mixed with a small portion of the first fly ash. Preferably, the additives are mixed with approximately 10 wt. % of the total weight percent of the first fly ash. This creates a thoroughly integrated premixture which can then be mixed with the remainder of the first fly ash to create the hydraulic cement compositions of the present invention.

Although the cement composition of the second embodiment can be formulated by mixing the components together at one time, it has been found that the following method is preferred. The process includes the following steps in which the weight percentages are of the total composition unless otherwise specified:

1. providing from about 25 wt. % to about 91.7 wt. % of a first subbituminous fly ash having a lime content;
2. separating out about a 10% portion of the first fly ash;
3. adding from about 0.1 to about 7 wt. % of the retarding agent; from about 0.1 to about 4 wt. % of citric acid; and from about 0.1 to about 6 wt. % of the alkali source to the 10% portion;
4. adding from about 8 wt. % to about 60 wt. % of the second fly ash to the 10% portion, the second fly ash being selected from the group consisting of lignite fly ash, bituminous fly ash and scrubber material; and
5. mixing the remainder of the first fly ash with the 10% portion to form a blended hydraulic cement.

Desirably, the third step will also include adding from about 0.1 wt. 45% to about 5 wt. % of lithium carbonate to the 10% portion.

The process may also include one or more of the following steps before the second fly ash is added to the 10% portion of the first fly ash: adding up to about 10 wt. % of the strength enhancing additive to the 10% portion; and adding up to about 5 wt. % of the pozzolanic agent to the 10% portion.

As with the first embodiment, if the mixture of boric acid and borax is used as the retarding agent, then the step of adding the retarding agent will include the steps of (a) adding from about 0.01 wt. % to about 6.9 wt. % of the total composition of borax to the 10% portion and (b) adding from about 0.01 wt. % to about 6.9 wt. % of the total composition of boric acid to the 10% portion so that the total weight percent of the mixture does not exceed about 7 wt. %.

To provide the cement composition with a minimum lime content, the process may also include the step of adding the 10% portion up to about 10 wt. % of the total composition of a beneficiating agent selected from the group consisting of calcium hydroxide and calcium oxide such that the beneficiating agent in combination with the lime content of the first fly ash provide the composition with the minimum lime content equal to 25% of the weight percent of the first fly ash.

To formulate a concrete material, fine aggregate, coarse aggregate and water are added to the hydraulic cement composition of the second embodiment, once it has been formulated. The amount of the materials to be added to this hydraulic cement composition are easily determinable by a person of skill in the art. The desired cement to water ratio for the cement compositions of this embodiment is about 1 to about 0.2–0.5 and is preferably about 1 to about 0.25–0.45.

The following examples are presented for illustrative purposes only and are not intended to be limiting. The following cement compositions were formed using the process outlined above and the indicated components in the indicated amounts.

EXAMPLE 1

| MATERIAL | % BY WEIGHT |
| --- | --- |
| Subbit. Fly Ash | 96.65 |
| Cement | 2.00 |
| Gypsum | 0.19 |
| Borax | 0.10 |
| Boric Acid | 0.03 |
| $K_2CO_3$ | 0.57 |
| Citric Acid | 0.48 |
| Total | 100.00 |

A neat paste was formed from the cement composition of Example 1 and it had an initial set time of 3 hours and 1 5 minutes and a final set time of 3 hours and 30 minutes. Three days after final set, a cube formed from the cement composition of this example had a strength of 8802.5 psi.

EXAMPLE 2

| MATERIAL | % BY WEIGHT |
| --- | --- |
| Subbit. Fly Ash | 92.63 |
| Cement | 5.99 |
| Borax | 0.19 |
| Boric Acid | 0.06 |
| $K_2CO_3$ | 0.68 |
| Citric Acid | 0.46 |
| Total | 100.00 |

A neat paste was formed from the cement composition of Example 2 and it had an initial set time of 2 hours and 30 minutes and a final set time of 2 hours and 40 minutes. Four days after final set, a cube formed from the cement composition of this example had a strength of 5372.5 psi.

EXAMPLE 3

| MATERIAL | % BY WEIGHT |
| --- | --- |
| Subbit. Fly Ash | 92.73 |
| Cement | 5.99 |
| Borax | 0.19 |
| Boric Acid | 0.06 |
| $K_2CO_3$ | 0.57 |
| Citric Acid | 0.46 |
| Total | 100.00 |

A neat paste was formed from the cement composition of Example 3 and it had an initial set time of 3 hours 30 minutes and a final set time of 3 hours and 45 minutes. Three days after final set, a cube formed from the cement composition of example 3 had a strength of 6047.5 psi.

EXAMPLE 4

| MATERIAL | % BY WEIGHT |
| --- | --- |
| Subbit. Fly Ash | 98.71 |
| Borax | 0.19 |
| Boric Acid | 0.06 |
| $K_2CO_3$ | 0.57 |
| Citric Acid | 0.48 |
| Total | 100.00 |

A neat paste was formed from the cement composition of Example 4 and it had an initial set time of 2 hours and 50 minutes and a final set time of 3 hours. Three days after final set a cube formed from this cement composition had a strength of 7315 psi.

EXAMPLE 5

| MATERIAL | % BY WEIGHT |
| --- | --- |
| Subbit. Fly Ash | 96.76 |
| Cement | 2.00 |
| Gypsum | 0.19 |
| $K_2CO_3$ | 0.57 |
| Citric Acid | 0.48 |
| Total | 100.00 |

A neat paste was formed from the cement composition of Example 5 and it had an initial set time of 45 minutes and a final set time of 55 minutes. After 19 hours, a cube formed from this cement composition had a strength of 7632.5 psi.

EXAMPLE 6

| MATERIAL | % BY WEIGHT |
| --- | --- |
| Subbit. Fly Ash | 92.77 |
| Cement | 5.99 |
| Gypsum | 0.19 |
| $K_2CO_3$ | 0.57 |
| Citric Acid | 0.48 |
| Total | 100.00 |

A neat paste was formed from the cement composition of Example 6 and it had an initial set time of 1 hour 1 5 minutes and a final set time of 1 hour and 28 minutes. After 20 hours, a cube formed from the composition of this example had a strength of 8947.5 psi.

EXAMPLE 7

| MATERIAL | % BY WEIGHT |
| --- | --- |
| Subbit. Fly Ash | 96.58 |
| Cement | 1.99 |
| Gypsum | 0.38 |
| $K_2CO_3$ | 0.57 |
| Citric Acid | 0.47 |
| Total | 100.00 |

A neat paste formed from the cement composition of Example 7 had an initial set time of about 55 minutes and a final set time of about 1 hours and 20 minutes. Five days after final set a cube formed from this composition had a strength of 1 1,21 5 psi.

EXAMPLE 8

| MATERIAL | % BY WEIGHT |
| --- | --- |
| Subbit. Fly Ash | 94.97 |
| Cement | 3.61 |
| Gypsum | 0.38 |
| $K_2CO_3$ | 0.57 |
| Citric Acid | 0.47 |
| Total | 100.00 |

This cement composition formed from Example 8 had an initial set time of about 1 hour and 22 minutes and a final set time of about 1 hour and 45 minutes. Five days after final set a cube formed from this composition had a strength of 10,345 psi.

EXAMPLE 9

| MATERIAL | % BY WEIGHT |
| --- | --- |
| Subbit. Fly Ash | 96.40 |
| Cement | 1.99 |
| Gypsum | 0.57 |
| $K_2CO_3$ | 0.57 |
| Citric Acid | 0.47 |
| Total | 100.00 |

The cement composition formed from Example 9 had an initial set time of about 1 hour and a final set time of about 1 hour and 15 minutes. After 24 hours, a cube formed from the composition of this example had a strength of 8845 psi.

EXAMPLE 10

| MATERIAL | % BY WEIGHT |
| --- | --- |
| Subbit. Fly Ash | 94.79 |
| Cement | 3.60 |
| Gypsum | 0.57 |
| $K_2CO_3$ | 0.57 |
| Citric Acid | 0.47 |
| Total | 100.00 |

A neat paste formed from the cement composition of Example 10 had an initial set time of about 1 hour and 15 minutes and a final set time of about 1 hours and 28 minutes. After 24 hours, a cube formed from the composition of this example had a strength of 8907.5 psi.

EXAMPLE 11

| MATERIAL | % BY WEIGHT |
| --- | --- |
| Subbit. Fly Ash | 94.97 |
| Cement | 3.61 |
| Gypsum | 0.38 |
| $K_2CO_3$ | 0.57 |
| Citric Acid | 0.47 |
| Total | 100.00 |

This cement composition formed from Example 11 had an initial set time of about 1 hour and 50 minutes and a final set time of about 2 hours and 10 minutes. Three days after final set a cube formed from this composition had a strength of 9865 psi.

EXAMPLE 12

| MATERIAL | % BY WEIGHT |
| --- | --- |
| Subbit. Fly Ash | 96.58 |
| Cement | 1.99 |
| Gypsum | 0.38 |
| $K_2CO_3$ | 0.57 |
| Citric Acid | 0.47 |
| Total | 100.00 |

A neat paste formed from the cement composition of Example 12 had an initial set time of about 3 hours and 35 minutes and a final set time of about 4 hours and 5 minutes. Three days after final set a cube formed from this composition had a strength of 10745 psi.

EXAMPLE 13

| MATERIAL | % BY WEIGHT |
| --- | --- |
| Subbit. Fly Ash | 29.89 |
| Lignite Ash | 55.50 |
| Clinker | 8.54 |
| Borax | 1.90 |
| Boric Acid | 0.57 |
| KOH | 1.80 |
| Citric Acid | 1.80 |
| Total | 100.00 |

The cement composition formed from Example 13 had an initial set time of 50 minutes and a final set time of 55 minutes. Four days from final set, a cube formed from this cement composition had a strength of 6080 psi.

EXAMPLE 14

| MATERIAL | % BY WEIGHT |
| --- | --- |
| Subbit. Fly Ash | 46.96 |
| Lignite Ash | 46.96 |
| Borax | 1.90 |
| Boric Acid | 0.57 |
| KOH | 1.80 |
| Citric Acid | 1.80 |
| Total | 100.00 |

The cement composition formed from Example 14 had an initial set time of 4 hours and 20 minutes and a final set time of 5 hours and 10 minutes. Four days from final set, a cube formed from this cement composition had a strength of 6295 psi.

EXAMPLE 15

| MATERIAL | % BY WEIGHT |
| --- | --- |
| Subbit. Fly Ash | 42.69 |
| Scrubber | 42.69 |
| Clinker | 8.54 |
| Borax | 1.90 |
| Boric Acid | 0.57 |
| KOH | 1.80 |
| Citric Acid | 1.80 |
| Total | 100.00 |

A cement material formed from the composition of Example 15 had an initial set time of about 1 hour and 19 minutes and a final set time of 1 hour and 28 minutes. A cube formed from this cement composition had a strength of 11 345 psi seven days after final set.

EXAMPLE 16

| MATERIAL | % BY WEIGHT |
| --- | --- |
| Subbit. Fly Ash | 76.85 |
| Bitumin. Fly Ash | 8.54 |
| Clinker | 8.54 |
| Borax | 1.90 |
| Boric Acid | 0.57 |
| KOH | 1.80 |
| Citric Acid | 1.80 |
| Total | 100.00 |

A cement formed from the composition of Example 16 had an initial set time of about 16 minutes and a final set time of 18 minutes. Two days from final set, a cube formed from this cement composition had a strength of 6902.5 psi.

EXAMPLE 17

| MATERIAL | % BY WEIGHT |
| --- | --- |
| Subbit. Fly Ash | 89.93 |
| Cement | 3.17 |
| Gypsum | 0.19 |
| $K_2CO_3$ | 0.65 |
| Citric Acid | 0.38 |
| Al. Silicate | 4.69 |
| $Li_2CO_3$ | 1.00 |
| Total | 100.00 |

EXAMPLE 18

| MATERIAL | % BY WEIGHT |
| --- | --- |
| Subbit. Fly Ash | 91.77 |
| Cement | 3.57 |
| Gypsum | 0.38 |
| $K_2CO_3$ | 0.56 |
| Citric Acid | 0.38 |
| Al. Silicate | 2.35 |
| $Li_2CO_3$ | 1.00 |
| Total | 100.00 |

EXAMPLE 19

| MATERIAL | % BY WEIGHT |
| --- | --- |
| Subbit. Fly Ash | 89.42 |
| Cement | 3.42 |
| Gypsum | 0.20 |
| $K_2CO_3$ | 0.68 |
| Citric Acid | 0.43 |
| Al. Silicate | 3.42 |
| Color | 1.47 |
| $Li_2CO_3$ | 1.00 |
| Total | 100.00 |

The cement compositions of the present invention are useful for forming concrete objects. Particularly, the cement compositions of the present invention can be used to manufacture concrete objects. Representative concrete objects include, but are not limited to, the following: concrete masonry units, such as bricks, blocks, and tiles; concrete pipe; prestress concrete; specialty concrete units, such as burial vaults, septic tanks, and prefabricated concrete units; roadways; and ornamental objects and statuary.

Concrete objects formed from the cement compositions of the present invention do not require special curing equipment or processes. The curing time of the blended hydraulic cement compositions of the present invention can adjusted, as demonstrated above in the examples, by adjusting the concentrations of the various ingredients and, in the case of the second embodiment, by also adding a second fly ash to the subbituminous fly ash. For example, conventional masonry units are heated, for example, in a kiln, and/or steam cured for periods of time which often exceed 24 hours. On the other hand, masonry units formed from the cement compositions of the present invention do not require either heating or steam curing because the cement compositions of the present invention can be formulated to set and cure in less than one hour and, preferably, when forming masonry units, can be formulated to set and cure to a required strength in about 30 minutes. Further, concrete objects formed from the cement compositions of the present invention exhibit negligible, if any, water absorption.

The cement compositions of the present invention can also be used to construct concrete articles such as roadways. Because the cement compositions of the present invention can be formulated for quick curing and high strength, a roadway, which is constructed using the cement compositions of the present invention, can be laid and ready for use in less than 24 hours. The quick curing nature of such a cement composition is particularly attractive in areas which experience high roadway usage and traffic. Further, roadways formed from the cement compositions of the present invention will have an improved useful life and strength when compared to asphalt.

One of skill in the art will appreciate that the cement compositions of the present invention have a wide variety of uses and that not all of those uses have been described herein.

While certain representative embodiments and details have been presented for purposes of illustrating the invention, it will be apparent to those skilled in the art that various changes in the cement compositions disclosed herein may be made without departing from the scope of the invention, which is defined in the appended claims.

What is claimed is:

1. A blended hydraulic cement composition comprising, by approximate weight percent:

from about 0.1 wt. % to about 7 wt. % of gypsum;

from about 0.1 wt. % to about 4 wt. % of potassium carbonate;

from about 0.1 wt. % to about 4 wt. % of citric acid;

from about 0.1 wt. % to about 5 wt. % of lithium carbonate; and from about 85 wt. % to about 99.7 wt. % of a subbituminous fly ash having a lime content.

2. The composition of claim 1 wherein the subbituminous fly ash has a lime content which is at least about 25% such that the lime content of the cement composition is provided by the subbituminous ash.

3. The composition of claim 1 further including from about 0.5 wt. % to about 2 wt. % of potassium hydroxide.

4. The composition of claim 1 further comprising up to about 10 wt. % of a beneficiating agent selected from the group consisting of calcium hydroxide and calcium oxide, such that the beneficiating agent in combination with the lime content of the subbituminous fly ash provides the cement composition with a minimum lime content of at least about 21%.

5. The composition of claim 1 further comprising up to about 10 wt. % of the total composition of a strength enhancing additive, wherein the strength enhancing additive is type I portland cement, ground cement clinker or ground slag.

6. The composition of claim 1 further comprising up to about 5 wt. % of a pozzolanic material selected from the group consisting of silica fume dust and meta-kaolin.

7. The composition of claim 5, wherein the composition comprises, by approximate weight percent of the total composition:

from about 0.1 wt. % to about 1 wt. % of gypsum;

from about 0.4 wt. % to about 2 wt. % of potassium carbonate;

from about 0.4 wt. % to about 1 wt. % of citric acid;

from about 0.1 wt. % to about 3 wt. % of lithium carbonate;

from about 88 wt. % to about 98.7 wt. % of the subbituminous fly ash; and from about 1 wt. % to about 10 wt. % of type 1 portland cement.

8. A concrete object formed from the blended hydraulic cement composition of claim 1.

9. A blended hydraulic cement composition comprising, by approximate weight percent:

from about 0.1 wt. % to about 7 wt. % of a retarding agent;

from about 0.1 wt. % to about 6 wt. % of an alkali source selected from the group consisting of potassium carbonate, potassium hydroxide and blends thereof;

from about 0.1 wt. % to about 4 wt. % of citric acid;

from about 0.1 wt. % to about 5 wt. % of lithium carbonate;

from about 25 wt. % to about 91.7 wt. % of a first subbituminous fly ash having a lime content; and from about 8 wt. % to about 60 wt. % of a second fly ash comprising lignite fly ash, bituminous fly ash or scrubber material.

10. The composition of claim 9 wherein the retarding agent is selected from the group consisting of gypsum; melamine formaldehyde; an anti-gelling dispersant; a mixture of borax and boric acid; and mixtures thereof.

11. The composition of claim 9 wherein the composition has a minimum lime content equal to 25% of the weight percentage of the first fly ash.

12. The composition of claim 11 wherein the lime content of the first fly ash equals at least 25% such that the minimum lime content of the composition is provided by the first fly ash.

13. The composition of claim 12 further comprising up to about 10 wt. % of a beneficiating agent selected from the group consisting of calcium hydroxide and calcium oxide, such that the beneficiating agent, in combination with the lime content of the first fly ash, provides the composition with the minimum lime content.

14. The composition of claim further comprising up to about 10 wt. % of a strength enhancing additive, wherein the strength additive is type I portland cement, ground cement clinker or ground slag.

15. The composition of claim 13 further comprising up to about 10 wt. % of a strength enhancing additive, wherein the strength enhancing additive is type I portland cement, ground cement clinker or ground slag.

16. The composition of claim 9 further comprising up to about 5 wt. % of a pozzolanic material selected from the group consisting of silica fume dust and meta-kaolin.

17. The composition of claim 13 further comprising up to about 5 wt. % of a pozzolanic material selected from the group consisting of silica fume dust and meta-kaolin.

18. A concrete object formed from the blended hydraulic cement composition of claim 12.

* * * * *

UNITED STATES PATENT AND TRADEMARK OFFICE
CERTIFICATE OF CORRECTION

PATENT NO. : 5,997,632
DATED : December 7, 1999
INVENTOR(S) : Robert William Styron It is certified that error appears in the above-identified patent and that said Letters Patent is hereby corrected as shown below:

Title page, , the assignee, "Mineral Resources Technologies, LLC" should read -- Mineral Resource Technologies, LLC --

Signed and Sealed this

Eighteenth Day of July, 2000

Attest:

Q. TODD DICKINSON

*Attesting Officer*          *Director of Patents and Trademarks*